2,991,231
PROCESS OF PRODUCING MALT
Otto C. Lucht, Joseph Shelley, and Leonard J. Burant, Milwaukee, Wis., assignors to Basic Products Corporation, Milwaukee, Wis., a corporation of Wisconsin
No Drawing. Filed Nov. 3, 1958, Ser. No. 771,237
5 Claims. (Cl. 195—70)

The present invention relates to the manufacture of malt and more particularly to a new and improved method of making malt which is free of acrolein producing organisms and substantially reduced in total bacteria count.

The primary object of the present invention is to manufacture malt which will not introduce into a fermentation mash organisms which produce acrolein and which is low in total bacteria count. More specifically, it is an object of the invention to provide a new and improved malt which is of a better quality than heretofore provided and which produces worts that are clear and of light color and which is generally a more satisfactory malt for fermentation than are malts heretofore commercially available.

A more detailed object of the present invention is to produce a new and improved malt from barley by steeping the grains of barley in a solution containing substances capable of acting synergistically to destroy and prevent the growth of those organisms normally present on barley and malt which are capable of producing acrolein during the fermentation of a distillers mash.

Acrolein ($CH_2$=CH—CHO) is a highly reactive volatile liquid substance with a sharp irritating odor and taste. When present in distilled fermented beverages, acrolein imparts a sharp bitter taste to the beverage thereby destroying its appeal to the consumer. The taste is extremely difficult to eliminate once a perceptible amount of acrolein is present. Even in very minute quantities, the substance is capable of affecting the taste of the product, and it is highly desirable to eliminate it completely.

The presence of acrolein in fermented products is the result if microbiological action of certain bacteria, believed to be a species of Lactobacillus organisms, on the alcohols, particularly glycerol, produced during fermentation of a saccharified mash. These bacteria have generally been traced to the malt from which the mash is prepared.

It has not been found practical to sterilize the malt at high temperatures in order to kill or eliminate the acrolein producing organisms because the high heat destroys the malt enzymes which are necessary to convert starch to sugar, and thereby destroys the usefulness of the malt in the distilling and brewing industries.

In the process of malting grains such as barley, it is common practice to steep the grain in water. The purposes of steeping barley in water are to clean the grain by removing foreign lightweight materials and to increase the moisture content of the barley in order that the embryo can be activated. Limited respiration can be observed during steeping. Following the steep, the barley kernels are allowed to germinate. During the germination the endosperm is modified and becomes friable and soft. In this stage of the process the enzyme system is increased and distributed throughout the endosperm so that it will act upon the starch and protein material in the kernel to produce sugars.

It has been discovered that, by processing the barley in accordance with the present invention, growth of acrolein producing organisms (A.P.O.) can be either completely eliminated or at least inhibited to such an extent that the microorganisms are no longer capable of producing acrolein in measurable amounts. We have found that by steeping grain to be malted in an aqueous steep solution containing a low concentration of certain metallic ions and a small amount of formaldehyde, the production of detectable amounts of acrolein in products produced from such malt can be eliminated.

Formaldehyde is known to have some germicidal properties, and dilute formaldehyde solutions have been used for steeping barley prior to malting. The use of formaldehyde is limited, however, in that excessive amounts, while sterilizing the barley, inhibit the germinating capacity of the barley and the result is an inferior malt. For most bactericidal purposes, in connection with treating barley to be used for malt, it has been found that a worktable concentration range for formaldehyde is from about 0.03% to about 0.3% by weight of the steep solution and that above an amount of about 0.3%, the formaldehyde steep solution interferes with normal germination of the barley. In these concentrations, formaldehyde by itself is incapable of preventing the growth of A.P.O. We have discovered, however, that A.P.O. can be eliminated by using the small amounts of certain metallic ions which, when present in the barley, cooperate synergistically with the formaldehyde.

It is not necessary for the metallic ion and the formaldehyde to be present simultaneously. It has been found that the extremely effective reduction in total bacteria and A.P.O. can be accomplished by applying the metallic ion first in a steep solution and then subsequently using formaldehyde.

Among the metallic ions which have been found to be effective in this process are those of the metals zinc, tin, manganese, nickel, cobalt, silver, copper and cadmium. Certain considerations in addition to the effectiveness of the metal for the purpose of eliminating A.P.O. must be applied in selecting the metallic ion to be used in a commercial operation, among which are economic and toxicity evaluations. If the malt is to be used for producing a distilled beverage, the metal salts employed will not appear in the final product, and the question of toxicity is not as important as that of economics. The former must be carefully considered, however, if the malt itself is to be used as a food product or if by products are produced from the distilling operation which are to be used as feeds.

From both an economic and toxicity standpoint at the present time, zinc is probably the most logical metal ion to use. Manganese and tin salts, while non-toxic, are somewhat more expensive.

While zinc in the form of a chloride salt is presently the preferred metallic component of the steep solution used in practicing the present invention, there is no intention to exclude other metals, the use of which will be obvious to those skilled in the art when practicing the present invention.

In one preferred process, acrolein producing organisms are eliminated by steeping the grain to be malted in water containing a mixture of zinc chloride and formaldehyde in low concentrations. More particularly, the A.P.O. elimination is accomplished by steeping the barley in a solution containing zinc chloride in an amount from about 0.05% to about 1% and formaldehyde in an amount of from about 0.03% to about 0.1% by weight of the steep solution.

One commercial form of zinc chloride which may be used is a technical grade of the salt having the following composition:

| | Percent |
|---|---|
| $ZnCl_2$ | 94 |
| $NH_3$ as $NH_4Cl$ (max.) | 3 |
| Water insoluble matter (max.) | 1.55 |
| Calcium as $CaCl_2$ (max.) | 0.40 |
| Sulfate as $SO_3$ (max.) | 1.03 |
| Iron (max.) | 1.03 |

A commercial form of formaldehyde is formalin which has the following composition.

| | |
|---|---|
| HCHO, min. | percent by wt__ 37 |
| Specific gravity 25°/25° C. | 1.080 to 1.102 |
| Acidity as HCOOH, max. | percent__ 0.02 |
| Methanol | do____ 6 to 7.5 |
| Iron as Fe, max. | p.p.m.__ 1 |

While concentration ranges have been found to be from about 0.05% to about 1% zinc chloride and from about 0.03% to about 0.1% formaldehyde, it has been found that an optimum concentration, giving extremely effective results in the destruction of acrolein producing organisms, is 0.2% zinc chloride and 0.05% formaldehyde. This solution can be produced for example, by the use of 0.016 lb. of technical zinc chloride per gallon of water and 0.00125 gallon of 40% formalin per gallon of water.

The following examples will serve to illustrate the present invention:

EXAMPLE I

Dry barley having a bacteria plate count of 100 million bacteria per gram, which when untreated is capable of producing up to 300 parts per million acrolein, was steeped for 16 hours in a solution containing 0.2% zinc chloride (technical) and 0.05% formaldehyde (from commercial grade of formalin). The above chemicals were in a concentrated liquid form and the proper amount was injected into the water as the steep tanks were being filled. The barley was allowed to steep or soak in the above solution for 16 hours. The tank was then drained and refilled with ordinary well water. The barley was allowed to steep for the remaining time of 6½ to 7 hours. After the barley steep was completed, the grain was taken through the rest of the process. Briefly, the process involved germinating the barley for 4 or 5 days and kilning the germinated barley to stop it from growing further in accordance with the normally accepted practice of making malt. The treated malt showed a plate count of 0.378 million bacteria per gram and a tube count of 0.2 million bacteria per gram, on tomato juice agar plates and tubes. The treated malt showed no perceptible incidence of A.P.O. in a standard A.P.O. test.

At the same time, a control sample was run with the malts being steeped in a solution without the addition of zinc chloride and formaldehyde. The control sample differed in processing from the treated sample in that it was highly sulfured in the kiln.

This is a customary practice in the manufacture of malt in the United States and comprises burning sulfur during the initial stages of drying and allowing the resultant combustion products to enter the air stream used in drying the malt. The sulfur dioxide, a major combustion product, reduces the total bacteria count of the finished malt and increases the extract and soluble protein and bleaches the malt. The sulfured control malt showed a plate bacteria count of 31.97 million bacteria per gram and a tube count of over 15 million bacteria per gram. An acrolein content of up to 50 parts per million was perceptible in the control samples.

Before the results are presented, it seems advisable to present the method used in determining the presence of A.P.O. and evaluating the results. The following is a description of this method.

One gram of the malt or barley to be tested is weighed on a sterilized pan and added to a sterilized fermentation medium. This medium is prepared by adding 40 grams of distillers dried solubles, 10 grams of powdered dry skim milk, 10 grams of yeast extract and 20 ml. of glycerol to 500 ml. of distilled water. The materials are made soluble by mixing in a Waring blendor until dissolved. This normally can be accomplished by mixing for five minutes. The solution is then made up to one liter with distilled water and the pH adjusted to exactly 5.5 with 0.1 N NaOH. 30 ml. aliquots of this medium are dispensed into culture tubes (20 x 200 mm. size), stoppered with cotton plugs, and sterilized at 15 lbs. pressure for 20 minutes.

The barley or malt in the fermentation medium is placed into an incubator at 37.5° C. for 24 hours. After incubation the mixture is distilled. The first two 1 ml. fractions are collected separately. The amount of acrolein present in these distillates is determined as follows. 0.5 ml. of tryptophan and 2 ml. HCl acid are added to the 1 ml. of distillate. (The tryptophan reagent is prepared as follows: 1.5 grams D.L. tryptophan is added to 500 ml. concentrated hydrochloric acid (38%) and diluted to 1 liter with distilled water.) The solution is mixed in the tubes and heated to 60° C. for five minutes in a hot water bath. If acrolein is present a violet color develops, the intensity of which is a function of the amount of acrolein in the distillate and not the number of bacteria present. By comparing the color of the solution with standards, a quantitative estimate of acrolein in p.p.m. can be obtained.

Each analysis is done in decuple. The results are reported in percent incidence. Whenever the concentration of acrolein is equal to or greater than 10 p.p.m., it is recorded as an incidence, whereas less than 10 p.p.m. is recorded (as a trace T) but not used in calculating percent incidence.

The test reported above is, at best, semi-quantitative. It should be remembered that each individual result is qualitative. The amount of acrolein produced under the test conditions is secondary to the production of acrolein itself. Thus, to make the test quantitative, the percent incidence in replicate designates degree of occurrence. Percent incidence is used as a criteria for purity.

The malt produced from the control sample and the treated sample had the following chemical analysis:

I. Acrolein and bacteria analysis (1) Dry barley—acrolein in p.p.m.—(8 samples)—
  300; 10; T; 30; 0; 10; 75; T
  Plate count—100,000,000
  Tube count—gas formers
(2) Control malt—acrolein in p.p.m.—(10 samples)—
  0, 10, 25, 0, 0, 50, 0, 0, 10, 0 (sulfured in kiln)
  Plate count—31,970,000/g.
  Tube count—over 15,000,000/g.
(3) Treated malt—acrolein in p.p.m.—(10 samples)—
  0, 0, 0, 0, 0, 0, 0, 0, 0, 0
  Plate count—378,000/g.
  Tube count—200,000/g.

II. Chemical analysis of malt

| | Control Sample | Treated Sample |
|---|---|---|
| Moisture | 5.1 | 5.2 |
| Extract F.G. as is | 66.6 | 65.5 |
| Extract F.G. dry | 70.2 | 69.1 |
| Color | 1.66 | 1.70 |
| Diastatic Power | 231 | 237 |
| Alpha Amylase | 53.7 | 55.6 |
| Total Protein | 13.6 | 13.9 |
| Soluble Protein | 5.96 | 5.55 |
| Percent S/T Protein | 43.8 | 40.1 |
| Agtron | 59.0 | 66.0 |
| Rapid Fermentation: | | |
|   Real Extract | 2.61 | 2.67 |
|   Apparent Degree of Fermentation | 81.5 | 79.4 |
|   Real Degree of Fermentation | 65.9 | 65.6 |

The results from the Standard Acrolein Test indicated elimination of A.P.O., while the tube and plate count showed a substantial reduction in total bacteria and the chemical analyses were substantially unchanged.

EXAMPLE II

Barley of the character described in Example I was steeped in a solution containing 0.5% zinc chloride and 0.05% formaldehyde. The malt produced gave a negative acrolein result with no perceptible acrolein being formed and very little or no bacterial growth on tomato juice agar plates and tubes.

EXAMPLE III

Barley was steeped in a 0.1% zinc chloride and 0.05% formaldehyde solution. The malt produced showed a plate count of 0.01 million bacteria per gram with a substantial reduction in perceptible A.P.O., and in most cases a complete elimination of A.P.O.

Above 1% zinc chloride, the germinating capacity of the barley kernel was affected. Further, above 1%, the zinc chloride treated malts are deficient in enzymes, resulting in insufficient starch conversion during mashing and fermentation.

The following table illustrates the effect of a steep solution containing metallic ions in combination with 0.05% by weight formaldehyde:

| Material | Concentration, Percent | Total Bacteria, Million/Gram | A.P.O., Percent Incidence |
|---|---|---|---|
| $ZnCl_2$ | 0.2 | 0 | 0 |
| $NiCl_2-6H_2O$ | 0.4 | 0.17 | 0 |
| $AgNO_3$ | 0.15 | 0.015 | 0 |
| $CoCl_2.6H_2O$ | 0.4 | 0 | 0 |
| $SnCl_2$ | 0.5 | 0 | 0 |
| $SnCl_2$ | 0.2 | 0 | 0 |
| $MnSO_4$ | 0.5 | 0.03 | 0 |
| $CdSO_4$ | 0.5 | 0 | 0 |
| $CuSO_4$ | 0.5 | 0 | 0 |
| Control | | 3.3 | 30 |

We claim as our invention:

1. In the production of barley malt, the step comprising steeping the barley kernels in water having added thereto from about 0.05 to about 1.0% by weight zinc chloride and from about 0.03 to about 0.3% by weight formaldehyde.

2. In the production of barley malt, the step comprising steeping the barley kernels in water having added thereto 0.05% formaldehyde and 0.2% zinc chloride.

3. The method of producing barley malt comprising the steps of steeping the barley in water having added thereto 0.2% zinc chloride and 0.05% formaldehyde, draining said barley and steeping further in water, germinating said steeped barley to produce a green malt and kilning said green malt thereby to destroy and prevent the growth of those organisms which are capable of producing acrolein during the fermentation of a mash produced from said barley malt.

4. In the production of grain malt the step comprising steeping the grain in water having added thereto from about 0.05 to about 0.1% by weight of a salt of a metal selected from the group consisting of zinc, manganese, tin, silver, nickel, cobalt, copper and cadmium, and from about 0.03 to about 0.3% by weight formaldehyde.

5. The method of producing grain malt as defined in claim 7 wherein said metal is zinc.

References Cited in the file of this patent

UNITED STATES PATENTS

| | | |
|---|---|---|
| 884,576 | Fritsche | Apr. 14, 1908 |
| 1,124,500 | Molhart | Jan. 12, 1915 |
| 1,263,817 | Takamine | Apr. 23, 1918 |
| 1,449,112 | Hayduck | Mar. 20, 1923 |
| 1,603,472 | Kahn | Oct. 19, 1926 |
| 1,938,081 | Meyer | Dec. 5, 1933 |

FOREIGN PATENTS

| | | |
|---|---|---|
| 155,288 | Great Britain | Mar. 15, 1922 |